United States Patent [19]
Hsieh

[11] Patent Number: 5,735,050
[45] Date of Patent: Apr. 7, 1998

[54] SPOON CONSISTING OF A BOWL AND AN EXTENDABLE HANDLE

[76] Inventor: Cheng-Yi Hsieh, No. 155,Sec.7,Changlu Rd., Fu Shing Hsiang, Changhua Hsien, Taiwan

[21] Appl. No.: 837,109

[22] Filed: Apr. 14, 1997

[51] Int. Cl.$^6$ .................................................. A47J 43/28
[52] U.S. Cl. ................... 30/324; 30/322; D7/653
[58] Field of Search ................... 30/324–328, 322, 30/323, 340; D7/653, 664; 16/115, 110 R

[56] References Cited

U.S. PATENT DOCUMENTS

| | | | |
|---|---|---|---|
| 1,108,767 | 8/1914 | Lechner | 30/328 |
| 2,291,981 | 8/1942 | Neururer | 30/324 |
| 2,812,577 | 11/1957 | Leibow | 30/324 |
| 4,615,120 | 10/1986 | Newman | 30/324 |

*Primary Examiner*—Douglas D. Watts
*Attorney, Agent, or Firm*—Bacon & Thomas

[57] ABSTRACT

A spoon consists of a oval-shaped bowl and a handle. The bowl has a neck which is fastened with one end of the handle. The handle is extendable and is composed of a primary handle and a secondary handle. The primary handle is provided at the proximal end thereof with a connection portion dimensioned to fit into a receiving slot of the neck of the bowl. The primary handle is provided therein with a channel extending in the direction of the longitudinal axis of the primary handle. The secondary handle is slidably received in the channel of the primary handle and is provided at the proximal end thereof with a retaining projection engageable with a retaining hole located at the distal end of the primary handle for locating the secondary handle which is fully extended.

1 Claim, 3 Drawing Sheets

5,735,050

SPOON CONSISTING OF A BOWL AND AN EXTENDABLE HANDLE

FIELD OF THE INVENTION

The present invention relates generally to a spoon, and more particularly to a spoon consisting of a bowl and an extendable handle which is made integrally with the bowl.

BACKGROUND OF THE INVENTION

In order to make the canned food more appealing to the consumer at large, the canned food is often attached with a small spoon or a foldable spoon to facilitate the eating of the canned food by the consumer. The foldable spoon is becoming more popular among the consumers in view of the small size and the inconvenience of the small spoon which is attached to the canned food.

The U.S. Pat. No. 4,615,120 discloses a foldable spoon, which can be folded to reduce its size for easy storage. However, either the small spoon or foldable spoon is defective in design in that its handle is often proved to be too short to allow the bowl of the spoon to reach the bottom of the can.

SUMMARY OF THE INVENTION

The primary objective of the present invention is to provide an improved spoon, which consists of a bowl, an extendable handle, and a neck located between the bowl and the extendable handle. The neck is provided with a square slot having an open side distal to the bowl. The square slot is provided in two opposite inner walls thereof with retaining points. The extendable handle consists of a primary handle and a secondary handle. The primary handle is connected with the beck by means of a tough tape and is provided at the proximal end thereof with a connection portion, which is so dimensioned as to fit into the square slot of the bowl neck. The primary handle is further provided therein with a channel extending in the direction of the longitudinal axis of the primary handle. The wall of the distal end of the primary handle is provided with a retaining hole. The secondary handle is slidably received in the channel of the primary handle and is provided at one end thereof with a retaining projection. The extended secondary handle is located by means of the retaining projection which is engaged with the retaining hole of the distal end of the primary handle.

The foregoing objective, features and functions of the present invention will be more readily understood upon a thoughtful deliberation of following detailed description of an embodiment of the present invention in conjunction with the accompanying drawings.

DETAILED DESCRIPTION OF THE EMBODIMENT

Figure 1:
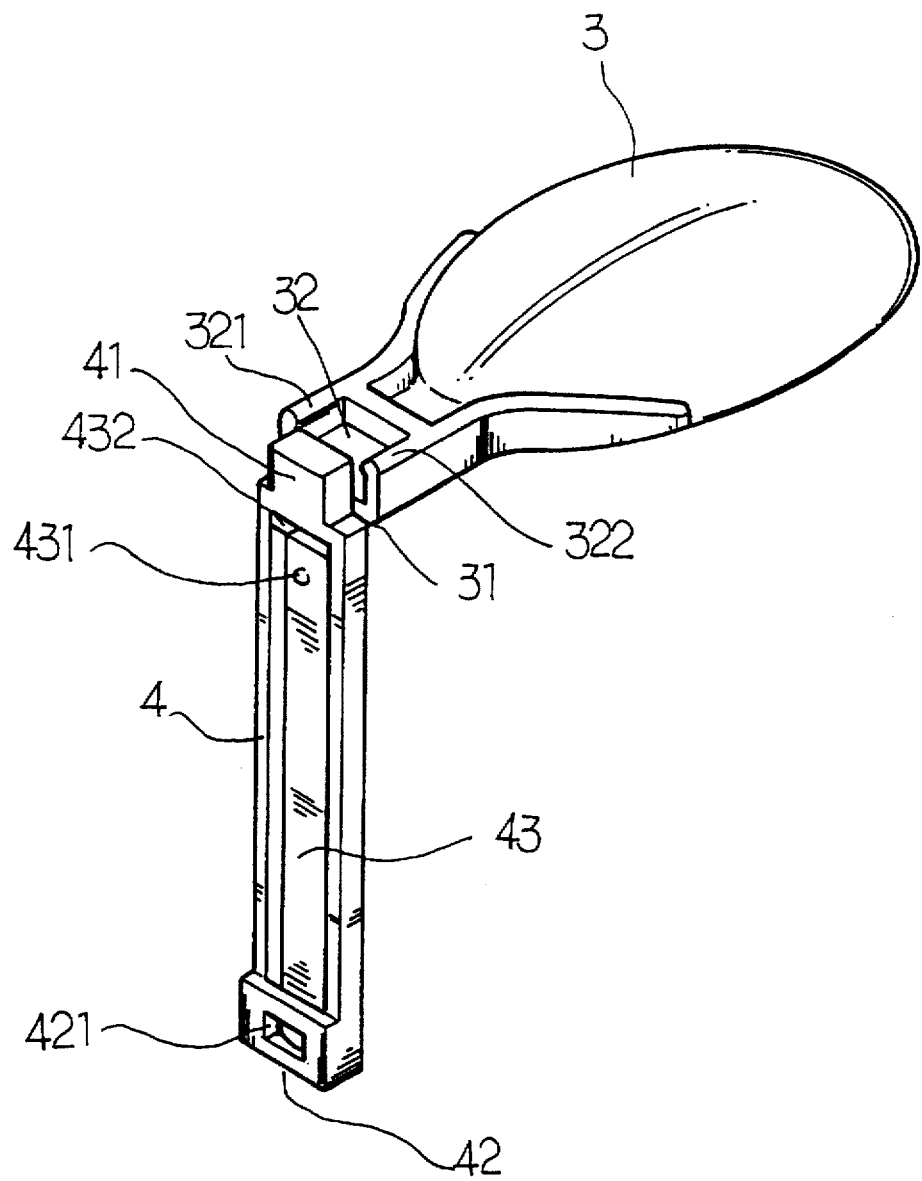
FIG. 1 shows a perspective view of the present invention.
Figure 2:
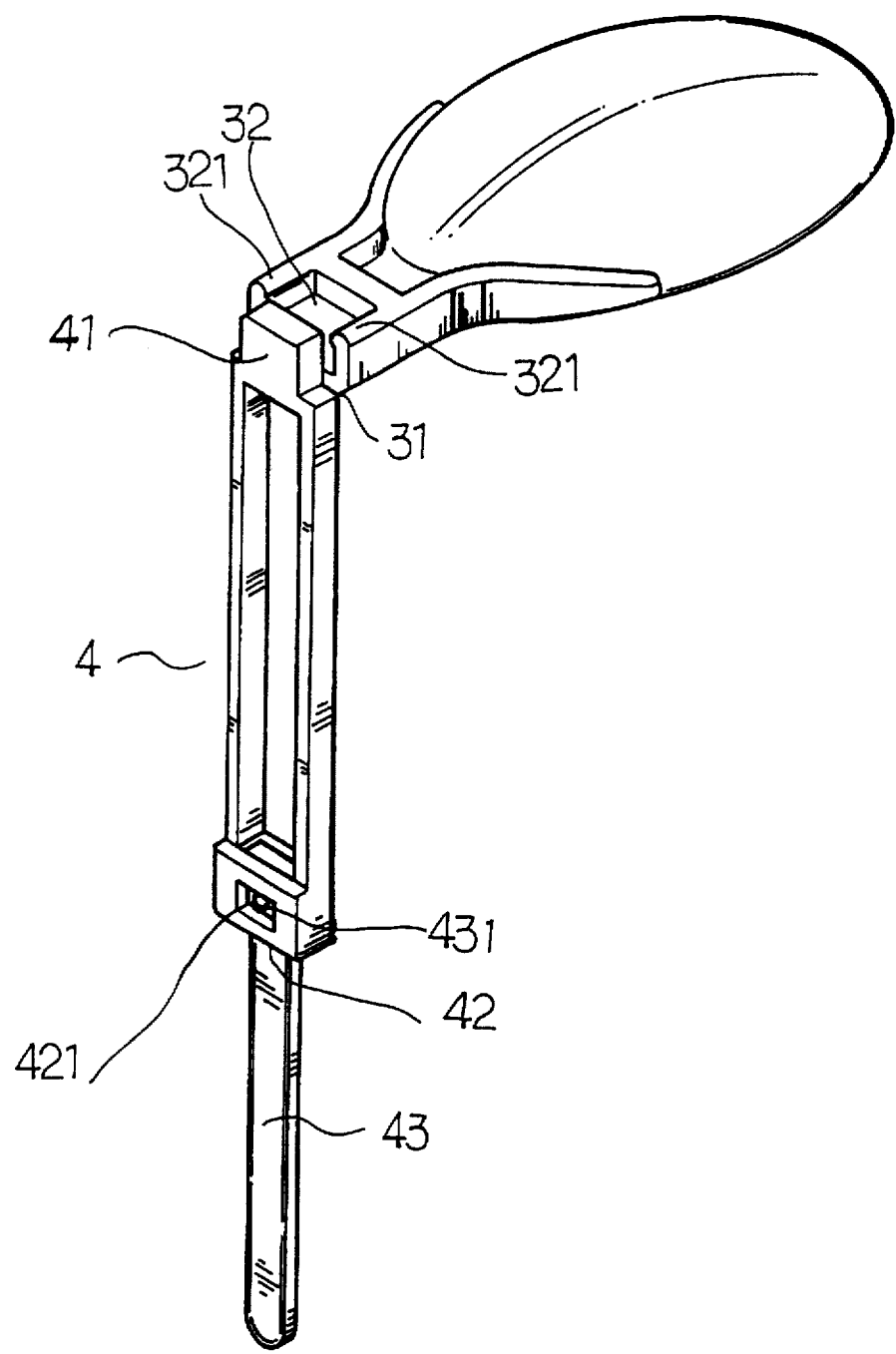
FIG. 2 shows a schematic view of the present invention in use.
Figure 3:
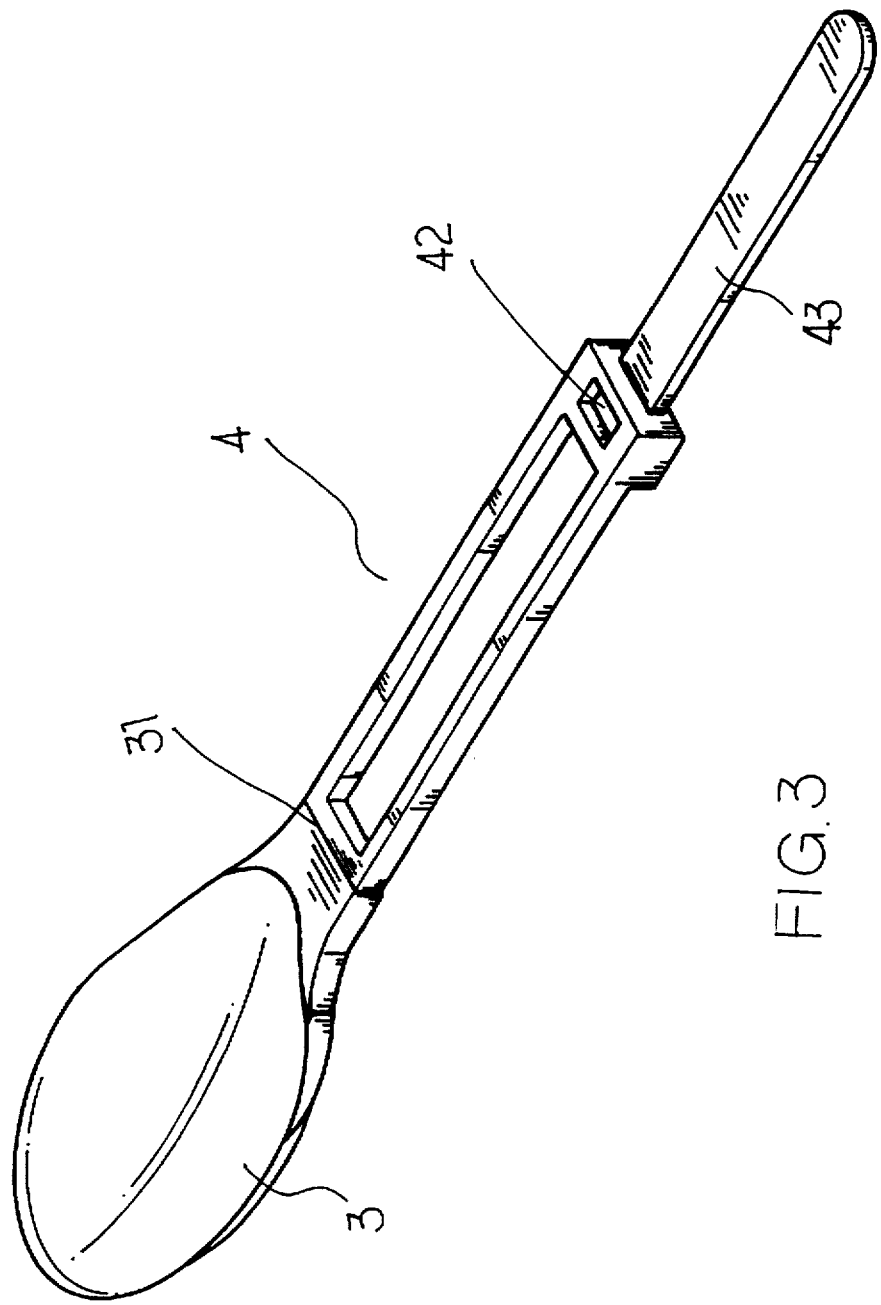
FIG. 3 shows another schematic view of the present invention in use.

As shown in all drawings provided herein, a spoon embodied in the present invention is composed of a bowl, an extendable handle, and a neck located between the bowl and the extendable handle.

The bowl 3 is oval in shape and is used for picking up food contained in a can. The bowl neck is provided with a square slot 32 having an open side distal to the bowl. The square slot 32 is provided in two opposite inner walls thereof with retaining points 321 and 322.

The extendable handle consists of a primary handle 4 and a secondary handle 43. The primary handle 4 is connected with the neck of the bowl 3 by means of a tough adhesive tape 31, and is provided at the proximal end thereof with a connection portion 41, which is so dimensioned as to fit into the square slot 32 of the neck of the bowl 3. The primary handle 4 is further provided therein with a channel 42 extending in the direction of the longitudinal axis of the primary handle 4 such that the channel 42 has an opening located at the distal end of the primary handle 4. The primary handle 4 is further provided at the distal end thereof with a retaining hole 421.

The secondary handle 43 is slidably received in the channel 42 of the primary handle 4 and is provided at the proximal end thereof with a retaining projection 431 engageable with the retaining hole 421 of the primary handle 4.

The extendable handle of the spoon of the present invention is extended by sliding the secondary handle 43 along the channel 42 of the primary handle 4 in the direction away from the bowl 3. Before the secondary handle 34 is pulled out of the channel 42 of the primary handle 4, the holding portion 432 of the distal end of the secondary handle 43 is held by the primary handle 4. However, the holding power of the holding portion 432 is so weak that it can be easily overcome to allow the secondary handle 43 to be pulled out along the channel 42 of the primary handle 4. The extended secondary handle 43 is located by means of the retaining projection 431 which is engaged with the retaining hole 421 of the distal end of the primary handle 4.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A spoon comprising:

a bowl having a neck; and a handle fastened at one end thereof with said neck of said bowl;

wherein said neck is provided with a slot of a shape and having an open side distal to said bowl;

wherein said handle consists of a primary handle and a secondary handle, said primary handle fastened at a proximal end thereof with said neck by an adhesive tape and provided at said proximal end thereof with a connection portion dimensioned to fit into said slot of said neck, said primary handle further provided therein with a channel extending in the direction of a longitudinal axis of said primary handle such that said channel is provided with an opening located at distal end of said primary handle, said primary handle still further provided at said distal end thereof with a retaining hole, said secondary handle received slidably in said channel of said primary handle such that said secondary handle can be moved along said channel in a direction away from said bowl, said secondary handle provided at a proximal end thereof with a retaining projection engageable with said retaining hole of said primary handle for locating said secondary handle at such time when said secondary handle is fully extended.

* * * * *